H. B. STEVENS.
COFFEE-HULLER AND CLEANER.
No. 172,795.  Patented Jan. 25, 1876.
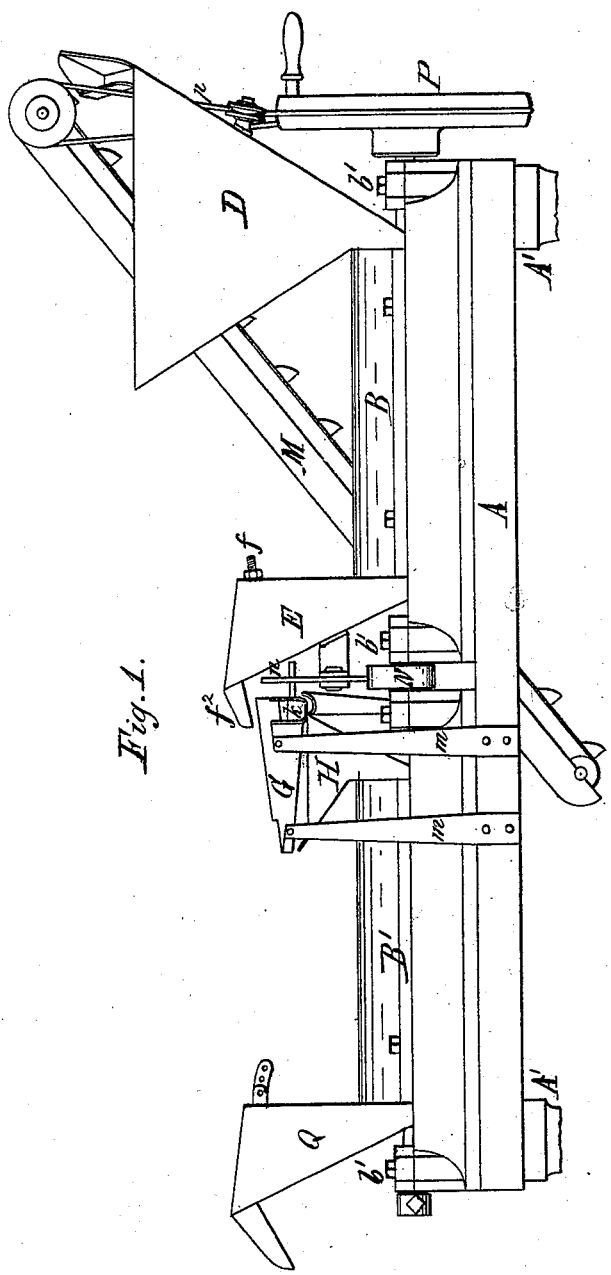
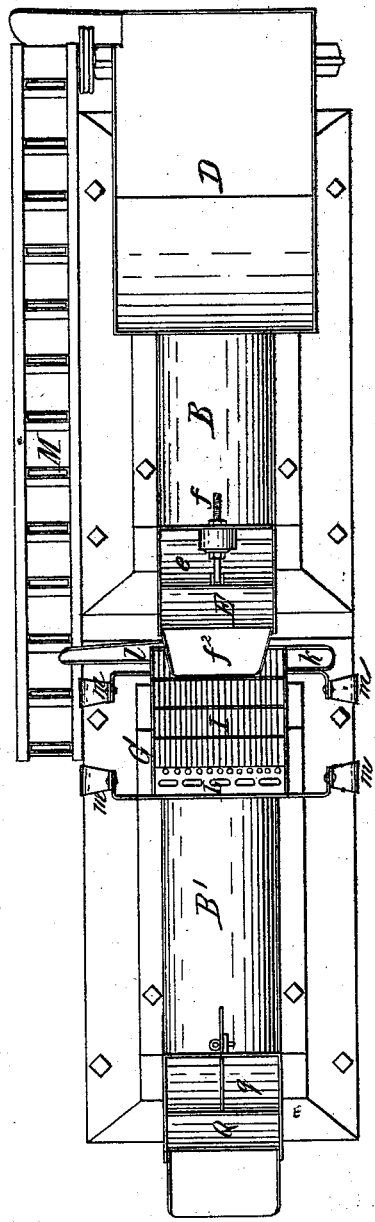

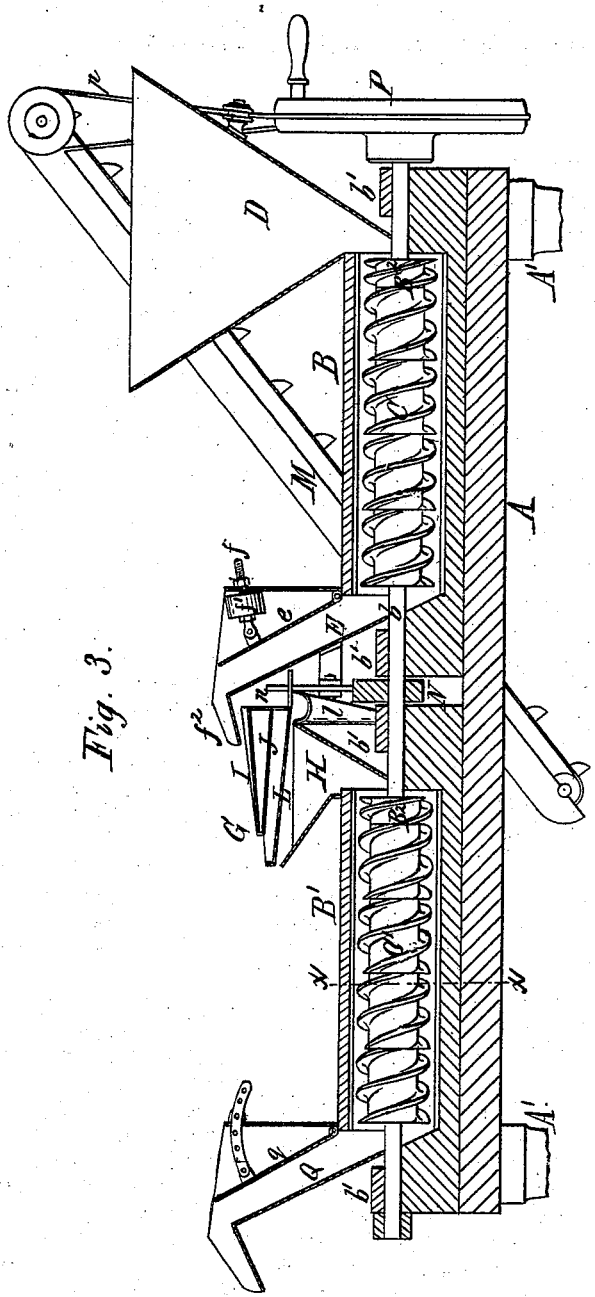
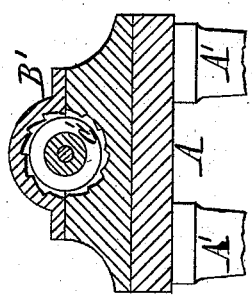

UNITED STATES PATENT OFFICE.

HENRY B. STEVENS, OF BUFFALO, NEW YORK, ASSIGNOR TO GEORGE L. SQUIER, OF SAME PLACE.

IMPROVEMENT IN COFFEE HULLERS AND CLEANERS.

Specification forming part of Letters Patent No. 172,795, dated January 25, 1876; application filed October 12, 1875.

*To all whom it may concern:*

Be it known that I, HENRY B. STEVENS, of the city of Buffalo, in the county of Erie and State of New York, have invented certain new and useful Improvements in Machines for Hulling Coffee and other Grains and Seeds, which improvements are fully set forth in the following specification, reference being had to the accompanying drawings.

My invention relates to that class of hulling-machines which consist, principally, of a hollow cylinder corrugated on the inside, in which revolve one or more metallic screws, and having an elevated discharge, so that the coffee is operated upon by the screw under a suitable pressure, whereby the skins and pulp enveloping the berry are detached and the latter polished.

Previous to my invention the coffee had to be operated upon repeatedly, in order to completely hull and polish the same in the hollow cylinder, so that only a certain limited quantity or batch of coffee could be hulled at a time, which batch or charge was delivered when finished, and the machine charged again with the new batch to be hulled, thus rendering the discharge of the hulled coffee intermittent, and preventing a uniform and continuous operation of the subsequent separator.

The object of my invention is to remedy this defect by providing a machine by which the coffee is hulled and polished in a single operation, and discharged in a continuous stream.

The nature of my invention will be fully understood from the following description:

In the accompanying drawings, consisting of two sheets, Figure 1 is a side elevation, Fig. 2 a plan view, and Fig. 3 a vertical section, of my improved machine. Fig. 4 is a cross-section in line $x$ $x$, Fig. 1.

Like letters of reference refer to like parts in each of the figures.

A is the rectangular frame or bed of the machine, supported on legs $A'$. $B$ $B^1$ are two hollow cylinders supported on the bed A, and C $C'$ the hulling-screws arranged in said cylinders, and mounted on a shaft, $b$, revolving in bearings $b'$. The cylinders $B$ $B^1$ are each composed of a lower stationary part secured to the bed A, and an upper removable part bolted or otherwise secured to the lower part. The inner surface of the cylinders $B$ $B^1$ is provided with angular corrugations, which cause the grains to roll over or turn over as they are carried forward by the screws. The screws C $C'$ are each composed of two or more sections, so arranged on the shaft that the ends of one section will coincide with the spaces, or be intermediate of the ends of the adjacent section, whereby the grains are caused to roll and change their relative position with reference to each other and to the metallic surfaces in their passage toward the discharge end of the cylinder.

$B^2$ represents a propeller or end section arranged at the feed end of each screw, and having threads of less pitch, so as to offer a greater resistance to the grains than the main portion of the screw, thereby preventing the grains from sliding back under pressure.

D is the hopper, into which the unhulled grain is fed, and which communicates at the bottom with the throat or feed end of the first cylinder B.

E is the discharge-hopper of the latter, connecting at its bottom with the discharge end of the cylinder, and having its rear side inclined at an angle more or less acute to facilitate the forcing up of the grain.

$e$ is an adjustable mouth-piece or tongue arranged in the hopper E, for regulating the pressure on the grain in the cylinder, as the condition of the grain may require.

The tongue $e$ consists of a plate or board of the same width as the hopper, and it is pivoted to the front wall of the hopper above the discharge-opening of the cylinder. The tongue $e$ is held in any desired position by a screw-bolt, $f$, and spring $f^1$, or any other suitable means. By swinging the tongue on its pivot the discharge-opening of the hopper is reduced or enlarged, and the pressure on the grain increased or lessened, as may be required.

$f^2$ is the lip or discharge-spout of the hopper E, and G a vibrating separator arranged below the lip $f^2$, and above the feed-hopper H of the second cylinder $B^1$.

This separator consists of an upper screen, I, the meshes of which are of such size as to retain all the grain, while permitting the fine particles of dust and chaff to pass through and fall on an inclined plate, J, from which they are discharged by a spout, k.

The grain will pass over the tail end of the screen I, and fall on a second screen, L, which is provided with oblong and round holes in alternate rows, through which the oblong and round hulled grains are passed into the feed-hopper H, while the unhulled grains pass over the tail end of the screen L, and are conducted by a spout, l, to an elevator, M, which returns the unhulled grains to the feed-hopper D of the first cylinder.

The screens I and L and plate J are all secured to one frame, which is supported on flexible arms m, secured with the lower ends to the bed A. A vibrating motion is imparted to the separator by means of a cam, N, mounted on the shaft b between the cylinders B B¹, and engaging with a rock-lever, n, or equivalent means. The elevator is driven by a belt, p, from the pulley or fly-wheel P on the shaft b, or in any other suitable manner. Q is the discharge-hopper of the second cylinder B¹, and provided with an adjustable mouth-piece, q, similar to that of the hopper E.

In working this machine the coffee or other grain is fed into the main hopper D, when the propeller of the screw C takes it and forces it forward into the cylinder B, the screw gradually working it along until it reaches the hopper E, the upward inclination of which, combined with its adjustable mouth-piece e, has a tendency to hold the grain back, while the propeller at the front of the screw forces it forward, and thus a compact mass accumulates in the cylinder, which mass is continually agitated under pressure by the screw with its alternating threads and the corrugations of the cylinder. The hulls are in this manner broken, and the inner skin rubbed off, not only by the uneven metallic surfaces of the screw and cylinder, but also by the rubbing of the grains against each other under pressure. By means of the adjustable mouth of the discharge-hopper, any desired pressure can be applied to the grain in the cylinder.

The grain is gradually forced in a continuous stream through the mouth of the hopper E, and falls upon the vibrating riddle I, where the fine chaff, dirt, and dust resulting from the grinding of the husks is taken out and separated from the grain and discharged through the spout k. The unhulled grain passing over the riddle L is discharged through the spout l onto the elevator M, by which it is carried back to the hopper D. The hulled grain passes through the riddle L into the hopper H, and thence through the second cylinder B¹, where it is operated upon in the same manner as in the first cylinder, by which means the silver or inner skin is rubbed off, and the grain thoroughly polished. The degree of the polish can be varied by varying the pressure by means of the adjustable mouth of the discharge-hopper. As the grain is finished it passes out in a continuous stream through the mouth of the hopper Q, and is ready to go to the final separator.

It is obvious that by adding still another cylinder and screw in the same way, the grain would receive still a higher polish; or, by decreasing the pressure in the mouths of the delivery-hoppers, so that less work would be done in said cylinder, the grain might be forced through faster, the three or more cylinders working faster under low pressure, and doing the work as well as two cylinders under high pressure.

It is also obvious that the cylinders, instead of being placed in a line with the screws, all mounted on the same shaft, might be placed side by side, or below each other, with the shafts of the different screws geared together, when the same results would be produced, though the machine would be more complicated.

I claim as my invention—

1. The combination, with the hulling-cylinder and screw B C and elevated discharge-hopper E, of one or more finishing-cylinders and screws, B¹ C', whereby the relative position of the grains is thoroughly changed in passing from one cylinder to the next one, and the discharge of hulled grain rendered continuous, substantially as hereinbefore set forth.

2. The combination, with the hulling-cylinder and screw B C and discharge-hopper E, of one or more finishing-cylinders, B¹ C', and one or more intermediate separators, G, substantially as and for the purpose hereinbefore set forth.

3. The combination, with the hulling-cylinder and screw B C, of the discharge-hopper E', separator G, elevator M, and feed-hopper D, substantially as and for the purpose hereinbefore set forth.

4. The combination, with the hulling-cylinder and screw B C, of the discharge-hopper E and adjustable mouth-piece e, arranged in the latter for regulating the pressure on the grain in the cylinder, substantially as hereinbefore set forth.

HENRY B. STEVENS.

Witnesses:
JNO. J. BONNER,
EDWARD WILHELM.